US010972465B1

(12) United States Patent
Bendersky et al.

(10) Patent No.: US 10,972,465 B1
(45) Date of Patent: Apr. 6, 2021

(54) SECURE AUTHENTICATION THROUGH VISUAL CODES CONTAINING UNIQUE METADATA

(71) Applicant: CyberArk Software Ltd., Petach-Tikva (IL)

(72) Inventors: Arthur Bendersky, Petach-Tikva (IL); Tal Zigman, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 16/680,111

(22) Filed: Nov. 11, 2019

(51) Int. Cl.
*H04L 29/06* (2006.01)
*H04L 9/32* (2006.01)
*G06F 21/36* (2013.01)
*H04W 12/06* (2021.01)
*H04W 12/00* (2021.01)

(52) U.S. Cl.
CPC .............. *H04L 63/10* (2013.01); *G06F 21/36* (2013.01); *H04L 9/3213* (2013.01); *H04L 9/3247* (2013.01); *H04L 63/0876* (2013.01); *H04W 12/00522* (2019.01); *H04W 12/06* (2013.01)

(58) Field of Classification Search
CPC .. H04W 12/00522; H04W 12/06; G06F 21/36
See application file for complete search history.

(56) References Cited

U.S. PATENT DOCUMENTS

| | | | | |
|---|---|---|---|---|
| 2013/0221084 | A1* | 8/2013 | Doss | H04L 63/0492 235/375 |
| 2015/0341484 | A1* | 11/2015 | Yablokov | H04M 1/72577 455/410 |
| 2017/0345394 | A1* | 11/2017 | Bansal | G06F 21/64 |

OTHER PUBLICATIONS

Wikipedia "Device Fingerprint—Wikipeida", retrieved on Nov. 11, 2019, Retrieved from the Internet, URL: https://en.wikipedia.org/wiki/Device_fingerprint.
Taylor, S., "Browser Fingerprinting—Explanation and Solutions", Retrieved on Nov. 11, 2019, Retrieved from the Internet, URL: https://restoreprivacy.com/browser-fingerprinting/.
Kornblum, J. "Identifying Almost Identical Files Using Context Triggered Piecewise Hashing" Digital Forensic Research Conference (2006).
GitHub "ssdeep Project—Fuzzy Hashing Program" retrieved on Nov. 11, 2019, Retrieved from the Internet, URL: https://ssdeep-project.github.io/ssdeep/index.html.

* cited by examiner

*Primary Examiner* — Dao Q Ho
(74) *Attorney, Agent, or Firm* — Finnegan, Henderson, Farabow, Garrett & Dunner LLP

(57) ABSTRACT

Disclosed embodiments relate to systems and methods for authentication through generating and communicating encoded representations containing unique application fingerprints, e.g., metadata. Techniques include receiving an access request, receiving application metadata, identifying a unique verification token, generating an encoded visual representation including the metadata and verification token, making available to the encoded visual representation for scanning by a user for verification of the metadata. Further techniques include requesting access to a secure resource, transmitting metadata, scanning an encoded visual representation including the metadata and a verification token, and sending the verification token to a security server to complete an authentication process.

20 Claims, 7 Drawing Sheets

SECURE AUTHENTICATION THROUGH VISUAL CODES CONTAINING UNIQUE METADATA

BACKGROUND

With the increased threat of hacking and phishing attacks to computer systems, there are greater needs for effective and efficient user authentication to prevent malicious users from gaining access to secure resources. Some methods for securing internet resources have been attempted, but these solutions are insufficiently secure, inefficient, or vulnerable to phishing attacks. Further, these methods may not provide a secure and efficient mode of authorization for user with a mobile device.

Metadata is data that provides information about other data, for example data relating to various parameters of software applications. Because some applications have a wide range of possible parameters and values, metadata can be useful to uniquely identify some computing devices. An identification based upon metadata can be useful in various devices or user authentication scenarios.

Barcodes and other encoded visual representations permit quick data transfer between mobile devices and other computing devices. Different systems currently use a variety of barcodes to transfer data, authenticate users, or identify products. Such barcodes permit mobile devices to interact directly with computing devices to quickly receive or transfer data. For example, a mobile device can scan a barcode displayed by the computing device, decode the barcode, and thereby obtain data for authorizing user access to certain restricted locations or systems. Because traditional barcodes can be scanned by many devices, they present security risks, including transfer of malicious data, exposure of private information, or granting of access to an unauthorized user. Traditional barcode authorization systems may also be susceptible to phishing attacks in which a malicious user attempts to access a restricted online resource and receives an authorization code. The malicious user may then use phishing techniques to send the barcode to an authorized user, who may scan the code and validate the authorization, thereby giving the malicious user access.

Accordingly, in view of these and other deficiencies in existing techniques, technological solutions are needed for effective and efficient secure authorization through encoded representations. Solutions should advantageously allow a user to be authenticated on a mobile device quickly and efficiently using an encoded visual representation containing unique metadata. Solutions should also guard against phishing attacks and other attempts by malicious users to gain access to secure locations. Such solutions should use metadata to determine if the device that requested access to a secure location is the same device that is being authorized for access. Solutions may also permit device identification with metadata that changes over time by employing fuzzy hashing techniques or periodically refreshing metadata.

SUMMARY

The disclosed embodiments describe non-transitory computer readable media, systems, and methods for secure authentication through visual codes containing unique metadata. For example, in an exemplary embodiment, there may be a non-transitory computer readable medium including instructions that, when executed by at least one processor, cause the at least one processor to perform operations for generating and communicating encoded visual representations containing unique application fingerprints. The operations may comprise receiving application metadata defining a plurality of diverse attributes of an application installed on a personal computing device, identifying a request by an identity to access a secure network resource, identifying a unique verification token, generating an encoded visual representation that contains the application metadata and the unique verification token, and making available to the identity the encoded visual representation for the personal computing device to verify the application metadata with respect to the application.

According to a disclosed embodiment, the application metadata may be received from the personal computing device in response to the identity requesting access to the secure network resource.

According to a disclosed embodiment, the application metadata may be received from the personal computing device as part of a registration process of the personal computing device.

According to a disclosed embodiment, the application metadata may be an aggregation of parameter values associated with the application.

According to a disclosed embodiment, the application metadata may be a hash of parameter values associated with the application.

According to a disclosed embodiment, the application metadata may be a fuzzy hash of parameter values associated with the application.

According to a disclosed embodiment, the application metadata may define values of parameters including one or more of: a time zone, a font, a rendered picture, an installed plugin, a header field, a cookies preference, a privacy setting, an advertising setting, a screen resolution, and a use of local storage.

According to a disclosed embodiment, the operations may further comprise generating a digital signature of the application metadata.

According to a disclosed embodiment, the operations may further comprise receiving, from the personal computing device, a result of a verification of the digital signature.

According to a disclosed embodiment, the determining of whether to validate the identity may be additionally based on a verification of the application metadata.

According to another disclosed embodiment, a method may be implemented for verifying identities based on encoded visual representations containing unique application fingerprints. The method may comprise transmitting application metadata defining a plurality of diverse attributes of an application installed on a personal computing device, requesting access to a secure network resource, scanning, in response to the request, an encoded visual representation that contains the application metadata and a unique verification token, identifying from the encoded visual representation the application metadata and the unique verification token, verifying the application metadata with respect to the application, conditional on the verifying being successful, sending to a security server the unique verification token.

According to a disclosed embodiment, the method may further comprise validating a digital signature of the application metadata and transmitting to the security server a result of the validating of the digital signature.

According to a disclosed embodiment, the digital signature may be received from the security server.

According to a disclosed embodiment, the method may further comprise based on the requesting access to the secure network resource, being redirected to the security server.

According to a disclosed embodiment, the method may further comprise periodically sending to the security server updated versions of the application metadata.

According to a disclosed embodiment, the application may be a browser installed on the personal computing device.

According to a disclosed embodiment, the method may further comprise scanning a second encoded visual representation, identifying from the second encoded visual representation a data value, and determining that the data value does not match the application metadata.

According to a disclosed embodiment, the method may further comprise generating an alert on the personal computing device when the verifying of the application metadata is unsuccessful.

According to a disclosed embodiment, the method may further comprise sending a report to the security server when the verifying of the application metadata is unsuccessful.

According to a disclosed embodiment, the method may further comprise rotating an authentication credential when the verifying of the application metadata is unsuccessful.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of secure authentication through generating and communicating encoded visual representations containing unique application fingerprints described herein overcome several technological problems relating to security and efficiency of user authorization. As described below, the disclosed embodiments provide techniques for secure authentication through one or more visual representations that contain metadata uniquely identifying a scanning device. A computing device may receive a request from a scanning device to access a secure network location. The computing device may then request and receive unique metadata from the scanning device. Using the metadata and a verification token, the computing device may then generate an encoded visual representation. The scanning device may then scan and decode the encoded visual representation. Having decoded the encoded visual representation, the scanning device may then compare the metadata contained in the encoded visual representation with the scanning device's corresponding metadata. If the metadata are sufficiently similar according to a predetermined standard, the authorization process may continue and the scanning device may send the verification token to a security sever. If the metadata are not sufficiently similar, access will be denied.

Reference will now be made in detail to the disclosed embodiments, examples of which are illustrated in the accompanying drawings.

Figure 1:
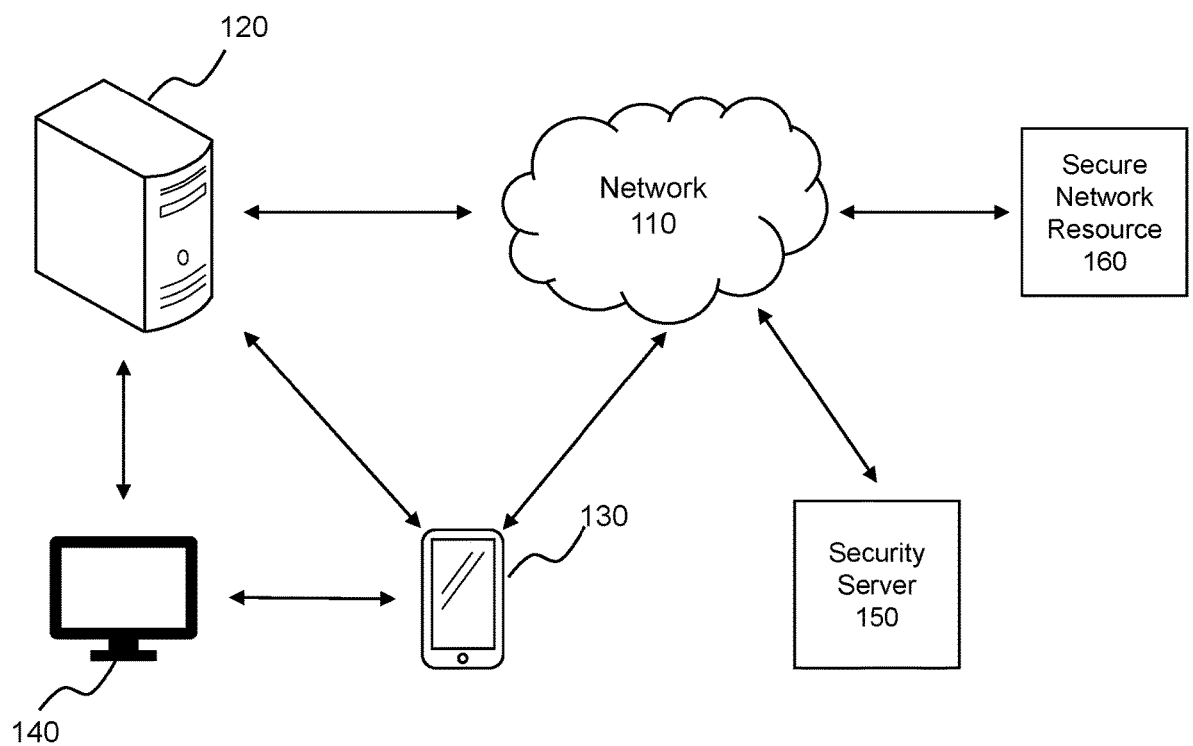
FIG. 1 is a block diagram of an exemplary system for secure authentication of a scanning device in accordance with disclosed embodiments.

FIG. 1 is a block diagram of an exemplary system for secure authentication through communicating encoded visual representations containing unique application fingerprints. System 100 may include a network 110, one or more computing device 120, one or more scanning device 130, one or more display medium 140, one or more security server 150, and one or more secure network resource 160 as shown in FIG. 1.

Computing device 120 may include a variety of different computing devices, including those capable of communicating over a network and those configured for short-range device-to-device communications. For example, computing device 120 may be a personal computer (e.g., a desktop or laptop), an IoT device (e.g., sensor, smart home appliance, printer, connected vehicle, industrial device, building security device, etc.), a server, a mainframe, a vehicle-based or aircraft-based computer, virtual machine or virtual container instance, or similar. Computing device 120 may also be a handheld device (e.g., a mobile phone, a tablet, notebook, digital camera, etc.), a wearable device (e.g., a smart watch, smart jewelry, an implantable device, a fitness tracker, smart clothing, a head-mounted display, etc.), ATM, connected kiosk (e.g., a ticketing kiosk, automated checkout, vending machine, roadside toll booth, bikeshare station, etc.), connected physical access point (e.g., a door lock, gate, road barrier, etc.), shared vehicle (e.g., Zipcar™, motorized scooter, bicycle, etc.) or various other devices capable of processing and/or receiving data. Computing device 120 may also be a server or other network connected computing resource. Additional details regarding computing device are described below in connection with FIG. 2A.

Computing device 120 may be in communication with scanning device 130 (e.g., mobile computing device) and/or display medium 140, as shown in FIG. 1. Computing device 120 may communicate with scanning device 130 directly, for example, through nearfield communications (e.g., Bluetooth, infrared, RFID, light patterns, sound signals, etc.). Alternatively, or in addition, computing device 120 may communicate with scanning device 130 through display medium 140 by presenting a code for the scanning device 130 to scan. Alternatively, or in addition, computing device 120 may communicate with scanning device 130 over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Scanning device 130 may be any device or external resource capable of scanning encoded content, such as a machine-readable code or image, light pattern, sound signal, temperature pattern, or other code. For example, scanning device 130 may be a personal computing device, such as a mobile phone, a tablet, a laptop, an e-reading device, a handheld gaming device, a digital camera, a mobile PC, a digital calculator, or the like. Scanning device 130 may also be a wearable device, such as a smart watch, a fitness tracker, smart jewelry or various other wearable devices. In some embodiments, scanning device 130 may be a device with a dedicated scanning functionality, such as a handheld image or document scanner. Scanning device 130 may also be a stationary device, such as a desktop or laptop computer with an auxiliary scanning component in communication with the device. Additional details regarding scanning device 130 are discussed below in connection with FIG. 2B.

Display medium 140 may be an electronic screen (e.g., LCD screen, LED screen, OLED screen, plasma screen, etc.), a physical printed depiction (e.g. a printed receipt, printed photo, sticker, etc.), lights, or the like. For example, display medium 140 may be a screen on an ATM that is configured to display the encoded code for scanning to permit a user to access the user's financial account. Alternatively, in such an embodiment display medium 140 may be configured to generate a physical (e.g., printed) paper or other material comprising the encoded code. In some embodiments, accordingly, display medium 140 may include a printer to generate printed visual representations on demand.

System 100 may also comprise one or more security servers 150 in communication with network 110. Security server 150 may manage the various elements of system 100. In some embodiments, security server 150 may be configured to process and manage requests between computing device 120 and scanning device 130. In some embodiments, as described in greater detail below, security server 150 may generate verification tokens used for user authentication. Security server 150 may also manage security threats and access to restricted systems. For example, in response to receiving a security report, security server 150 may deny system access to, or extradite an attack attempt by, an unauthorized device (e.g., unauthorized scanning device 130). Security server 150 may also manage and store updated metadata for authorized scanning devices.

Figure 2A:
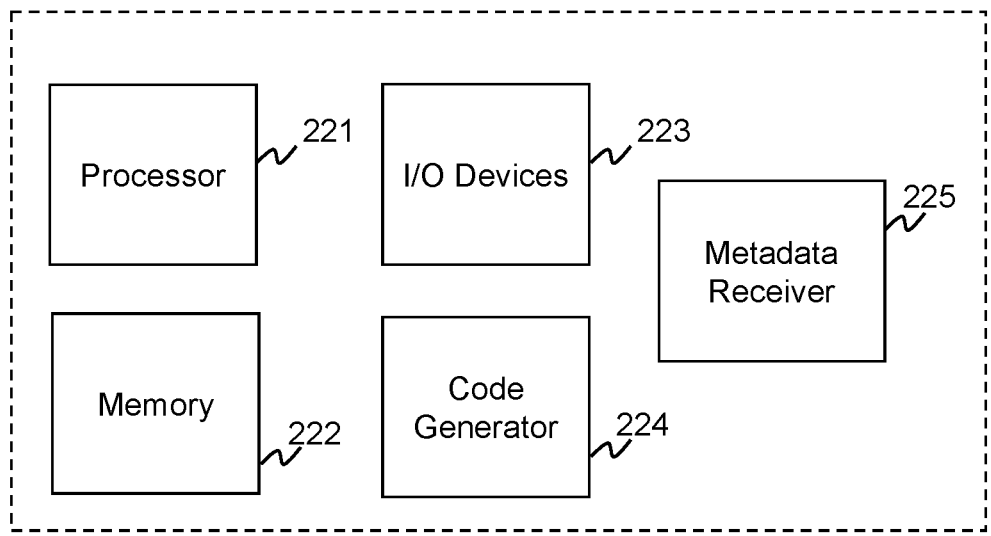
FIG. 2A is a block diagram showing an exemplary computing device in accordance with disclosed embodiments.

FIG. 2A is a block diagram showing an exemplary computing device 120 in accordance with disclosed embodiments. Computing device 120 may include one or more processors 221, one or more memories 222, one or more input/output (I/O) devices 223, one or more code generator components 224, and one or more metadata receivers 225. Processor (or processors) 221 may include one or more data or software processing devices. For example, the processor 221 may take the form of, but is not limited to, a microprocessor, embedded processor, or the like, or may be integrated in a system on a chip (SoC). Furthermore, according to some embodiments, the processor 221 may be from the family of processors manufactured by Intel®, AMD®, Qualcomm®, Apple®, NVIDIA®, or the like. The processor 221 may also be based on the ARM architecture, a mobile processor, or a graphics processing unit, etc. The disclosed embodiments are not limited to any type of processor configured in the computing device 120.

Memory (or memories) 222 may include one or more storage devices configured to store instructions used by the processor 221 to perform functions related to the disclosed embodiments. Memory 222 may be configured to store software instructions, such as programs, that perform one or more operations when executed by the processor 221 to perform operations for generating and communicating unencoded visual representations containing unique application fingerprints to a scanning device 130, for example, using method 400, described in detail below. The disclosed embodiments are not limited to particular software programs or devices configured to perform dedicated tasks. For example, the memory 222 may store a single program, such as a user-level application, that performs the functions of the disclosed embodiments, or may comprise multiple software programs. Additionally, the processor 221 may in some embodiments execute one or more programs (or portions thereof) remotely located from the computing device 120. Furthermore, the memory 222 may include one or more storage devices configured to store data for use by the programs.

Input/output devices 223 may include one or more integrated ports, cards, or stand-alone devices configured to allow data to be received and/or transferred by the computing device 120. The I/O devices 223 may include one or more network adaptors or communication devices and/or interfaces (e.g., WiFi, Bluetooth®, RFID, NFC, RF, infrared, etc.) to communicate with other machines and devices, such as with other components of system 100 through network 110. In some embodiments, the I/O devices 223 may comprise a touchscreen configured to allow a user to interact with the computing device 120, and in some embodiments, the I/O devices 223 may comprise a keyboard, mouse, trackball, touch pad, stylus, and the like.

Code generator(s) 224 may allow computing device 120 to generate a scannable code or other encoded representation of data, such as a QR code, a barcode, an encoded image, or another scannable code. In some embodiments, encoded visual representations may take the form of a scannable code. Such scannable code may be a QR code or other bar code format, and thus may conform to various standards or specifications, such as ISO/IEC 18004:2015. In addition to QR codes, other forms of 2D scannable codes may be used, such as a data matrix, Aztec, PDF417, Micro QR, MicroPDF417, CodaBlock-F, MaxiCode, Microsoft Tag, Shotcode, DotCodeetc, PM code, etc. In some embodiments, 1D bar codes or other lower-capacity formats may also be utilized.

In some embodiments, encoded visual representations may vary in color or other pattern. Such codes may be created using a variety of color models, such as RGB, CMY, TSL, etc. In some embodiments, colored codes may be produced by using visual variations other than color (e.g., patterning, shading, etc.). In some embodiments, the encoded visual representation may be a unified code comprising two or more codes, for example, a multi-color QR code comprising two or more single color QR codes. Other color combinations and variations are possible as well.

In some embodiments, the encoded visual representation may be presented as an image. For example, scanning device 130 may use image processing techniques to ascertain data based on the content of the image, or the location of certain elements in the image. Computing system 120 may also be configured to embed data within or on top of an image, for example using a digital watermark, etc. The encoded visual representation may also be a proprietary code or format that may not be readable by other systems or devices. This may provide added security to system 100. Code generator 224 may also generate non-visual forms of encoded representations of data (e.g., sound signal, heat signal, vibration signal, etc.).

Code generator 224 may be a separate component of computing device 120, for example, with dedicated processors and/or memories. In other embodiments, though shown separately in FIG. 2A, code generator 224 may be integrated into memory 222 and/or processor 221. For example, code generator 224 may be a software code, a script, or application stored on memory 222 and/or executed by processor 221.

Metadata receivers(s) 225 may allow computing device 120 to receive metadata from a scanning device 130. Metadata may be from a software application, web browser, image, document, email, or various other sources. Metadata is described in greater detail below with respect to FIGS. 3A and 3B. Metadata receiver 225 may be a separate component of computing device 120, for example, with dedicated processors, memories, and/or I/O hardware. In other embodiments, though shown separately in FIG. 2A, metadata receiver 225 may be integrated into memory 222, processor 221, and/or I/O devices 223. For example, metadata receiver 225 may be a software code, a script, or application stored on memory 222 and/or executed by processor 221. In some embodiments, the metadata receiver 225 may be a network adaptor or communication device and/or interface (e.g., WiFi, Bluetooth®, RFID, NFC, RF, infrared, etc.).

Figure 2B:
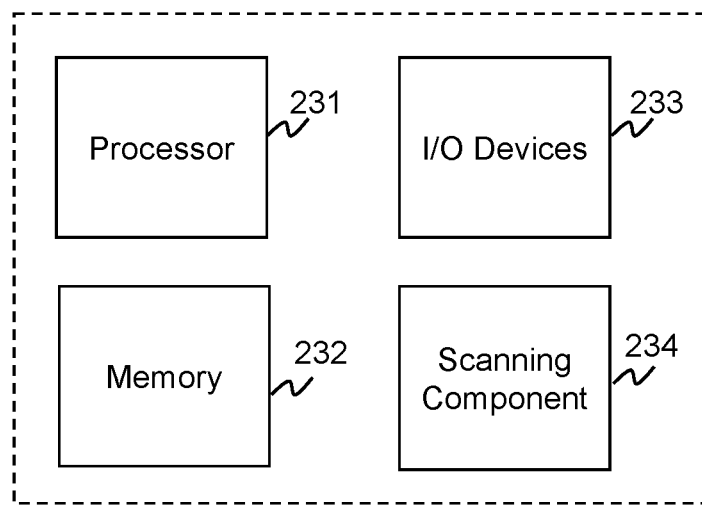
FIG. 2B is a block diagram showing an exemplary scanning device in accordance with disclosed embodiments.

FIG. 2B is a block diagram showing an exemplary scanning device 130 in accordance with disclosed embodiments. Scanning device 130 may include one or more processors 231, one or more memories 232, one or more input/output (I/O) devices 233, and one or more scanning components 234. As described above, scanning device 130 may be a mobile device or various other devices capable of scanning an encoded code. Similar to processor 221, as described above, processor 231 may include one or more data or software processing devices. For example, the processor 231 may include, but is not limited to, a microprocessor, embedded processor, or a processor integrated in an SoC.

Memory (or memories) 232 may include one or more storage devices configured to store instructions used by the processor 231 to perform functions related to the disclosed embodiments. The memory 232 may be configured to store software instructions, such as programs, that perform one or more operations when executed by the processor 231 to securely receive data from computing device 120, for example using methods 600 or 900, described below. Memory 232 may be similar to memory 222 described above. For example, memory 232 may include a single program, such as a user-level application, that performs the functions of the disclosed embodiments, or may comprise multiple software programs.

I/O devices 233 may also be similar to the I/O devices 223 described above for computing system 120. For example, I/O devices 233 may include one or more network adaptors or communication devices and/or interfaces (e.g., WiFi, Bluetooth®, RFID, NFC, RF, infrared, etc.) to communicate with other machines and devices, a touchscreen configured to allow a user to interact with the scanning device 130, a display, a keyboard/keypad, a mouse, a trackball, a touch pad, a stylus, sensors (e.g., gyroscopes, accelerometers, thermometers, cameras, scanners, etc.), and the like.

Scanning component 234 may be configured to capture an image (e.g., a 2D scannable code), a light pattern, a color pattern, a sound signal, a heat signal, or other types of encoded signals. Scanning component 234 may be a hardware component, such as a barcode scanning component, a camera, a document scanner, a microphone, a gyroscope, a thermometer, a pressure sensor, or the like. In some embodiments, scanning component 234 may be an auxiliary component that communicates with scanning device 130 via Bluetooth®, WiFi, USB, etc. Scanning component 234 may have a dedicated processor and/or memory for capturing, storing and processing the scanned image. In some embodiments, scanning component 234 may describe a software component, such as a code, a script, an application or other form of software, which may be stored on memory 232 and/or executed by processor 231. In such embodiments, scanning component 234 may utilize a camera or scanner included in I/O devices 233 to scan the scannable code.

Figure 3A:
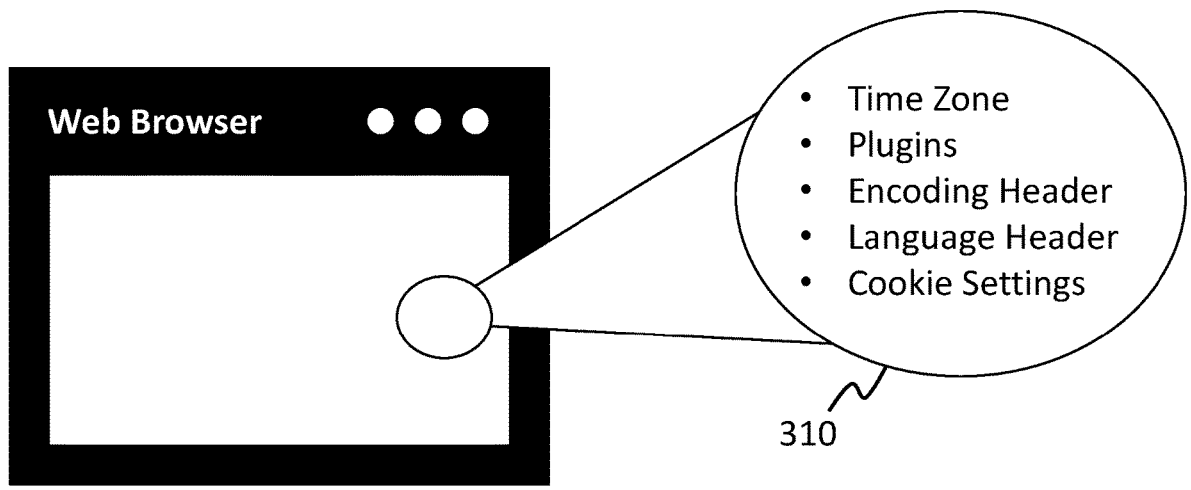
FIG. 3A is an illustration depicting exemplary metadata for a software application in accordance with disclosed embodiments

FIG. 3A is an illustration of exemplary metadata 310 and 320 of a user's web browser or other software application. For example, the web browser may be software configured to allow a user of a device to access to the access the internet (e.g. Internet Explorer, Microsoft Edge, Google Chrome, Mozilla Firefox, Opera, Safari, etc.). Metadata 310 and 320 may facilitate identification of a specific user or device because it can create a unique digital fingerprint. Often an aggregation of metadata 310 and 320 from an application such as a web browser will be unique to specific device. In other words, no other devices, or at least a statistically insignificant number of other devices, may have the same set of parameters. Metadata 310 and 320 therefore may permit identification of a specific device with a reasonable level of certainty because it is unlikely that another device uses the exact same set of various parameters and the same values of those parameters. Metadata 310 for a web browser may comprise, without limitation, browser configuration information (e.g., type of browser, installed plugins, encoding header, language header, cookie settings, connection header, tracking preferences, list of installed fonts, advertising settings, privacy settings, a rendered picture, content encoding header, content language header, various other HTTP headers, Javascript attributes, etc.). Metadata 310 for a web browser may also comprise device information (e.g., operating system, CPU, GPU, battery, display(s), display settings, IP address, use of local storage, and other hardware or software information). Metadata 310 for a web browser may also comprise location information (e.g., time zone, GPS coordinates, internet service provider, and other location identifiers). Metadata 310 for a web browser or software application may also comprise a variety of other parameter values associated with the application.

Figure 3B:
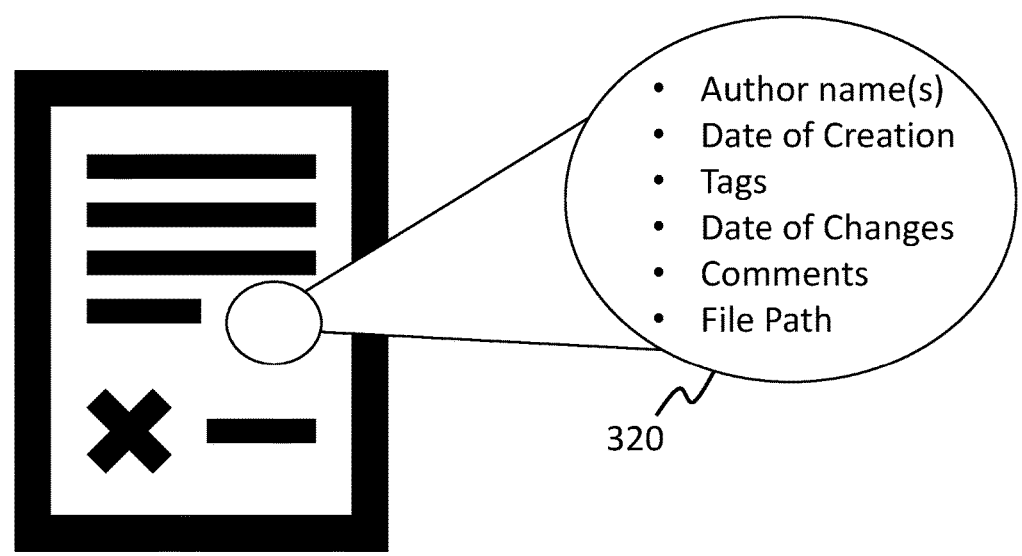
FIG. 3B is an illustration depicting exemplary metadata for a document in accordance with disclosed embodiments.

FIG. 3B is an illustration of exemplary metadata 320 of a document, such as an editable text document, PDF, spreadsheet, etc. As illustrated in FIG. 3B, metadata 320 for a document may comprise specific data or parameter values about the document's creation and edits, such as the author's name or names, company, date of creation, date of edits or changes, date last accessed, date last printed, comments within the document, edit time, formatting, template information, hidden text, hidden images, etc. Document metadata 320 may also comprise more general information about the document such as the document title, file name, file type, file path, application used to create the document, version of the application, subject, keywords, tags, word count, page count, line count, character count, file size, etc. Although FIGS. 3A and 3B show exemplary metadata 310 and 320 for a web browser and a document, respectively, it is understood that metadata may also relate to a variety of other sources, such as images, videos, emails, database entries, web pages, audio files, etc. Likewise, the specific examples of metadata 310 and 320 shown in FIGS. 3A and 3B, and discussed in the corresponding description, are only exemplary and it is understood that metadata 310 and 320 may include a variety of other data or parameter values.

Figure 4:
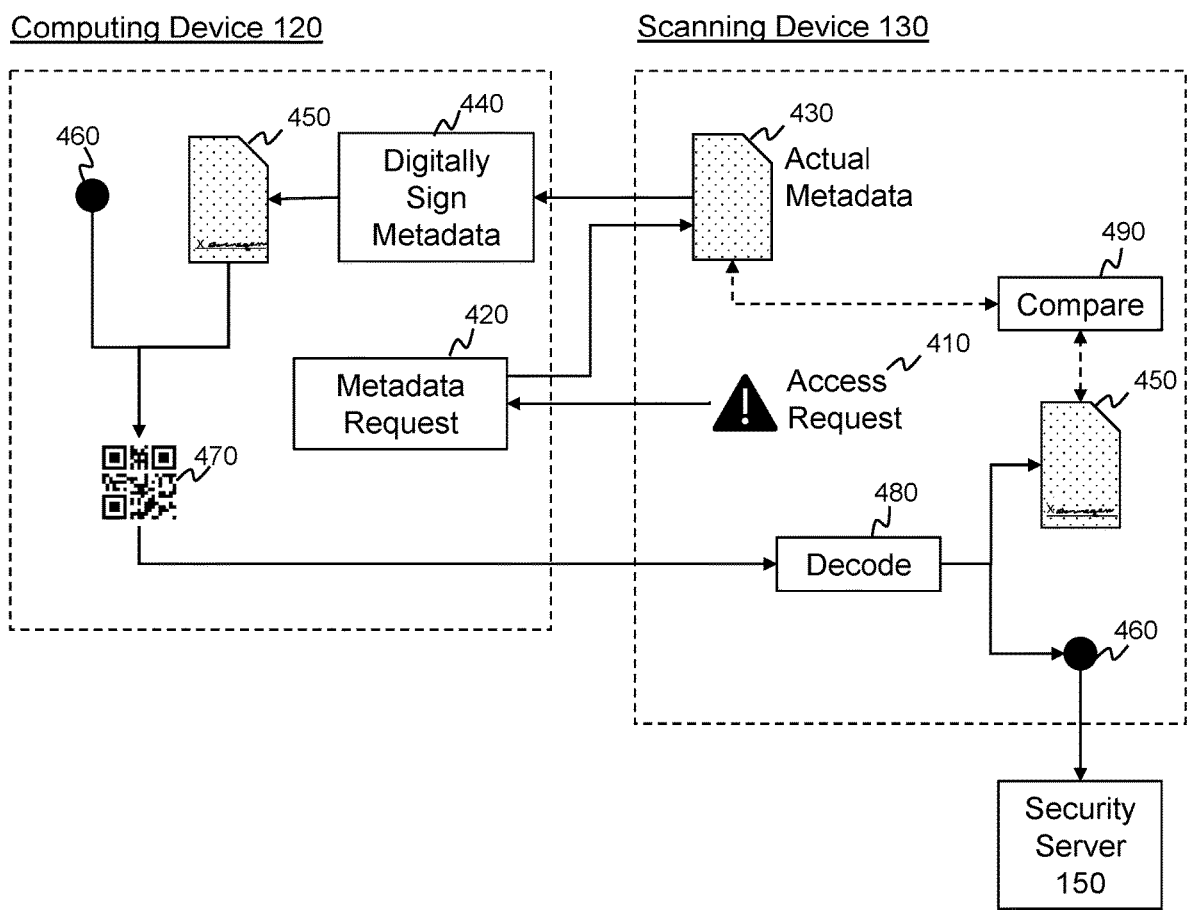
FIG. 4 is a block diagram depicting an exemplary process for securely authenticating a scanning device in accordance with disclosed embodiments.

FIG. 4 is a block diagram depicting an exemplary process 400 for secure authentication of a user or other identity. Process 400 may be triggered in response to a computing device 120 receiving an access request 410 from a scanning device 130. For example, this may occur when a user of scanning device 130 attempts to access a secure network resource 160. In some embodiments, computing device 120 may receive access request 410 from security server 150 or another device communicating with network 110 (e.g., a user's personal computer) in response to a user's attempt to access secure network resource 160 or another restricted location. As another example, process 400 may commence when a user of scanning device 130 attempts to access a personal computing device, an operating system, an application, etc. Various other scenarios may trigger a need for computing device 120 to authenticate a user of scanning device 130, and hence may prompt access request 410.

Computing device 120 may send a metadata request 420 to scanning device 130 in some embodiments. In response to metadata request 420, scanning device 130 may send it its metadata 430 to computing device 120. Metadata 430 may include metadata from a web browser or document, as described above with respect to FIGS. 3A and 3B. Metadata 430 may also include metadata from other sources (e.g., other software applications, images, videos, emails, database entries, web pages, audio files, etc.). In some embodiments, metadata 430 may be an aggregation of metadata from a single source or multiple sources. In other embodiments, metadata 430 may be metadata relating to a single aspect of a single source (e.g., a specific header of a web browser). According to various different embodiments, metadata 430 may be pre-stored and available for accessing on scanning device 130, or may alternatively be collected or generated on demand (e.g., in response to metadata request 420).

In other embodiments, scanning device 130 may send metadata 430 to computing device 120 concurrently with access request 410. In that situation, metadata request 420 may be unnecessary and/or a redundant measure. In some embodiments, scanning device 130 may send metadata 430 to security server 150. By its nature, metadata 430 may change frequently over time. In some embodiments, the scanning device 130 may periodically refresh metadata 430 by sending updated metadata 430 to computing device 120 or security server 150 at predetermined time intervals (e.g., hourly, daily, weekly, etc.). The updated metadata may comprise all of metadata 430 from scanning device 130. In other embodiments, the updated metadata may comprise only the metadata that changed from a prior update. Such periodic refreshing permits authentication based upon metadata that changes frequently.

In some embodiments, metadata 430 may be sent to computing device 120 or security server 150 as part of a registration process of scanning device 130. Scanning device 130 may be preregistered in some embodiments with computing device 120 or security server 150. In this case, computing device 120 or security server 150 may store metadata 430 for future use. In some embodiments, in response to receiving access request 420, computing device 120 may retrieve metadata 430 from storage. In other embodiments, computing device 120 may request the stored metadata 430 from security server 150.

Metadata 430 may be sent in its raw form to computing device 120 or security server 150. In some embodiments, metadata 430 may be an aggregate of multiple metadata values. In other embodiments, metadata 430 may be pre-processed (e.g., through a hashing algorithm) by the scanning device 130 and sent to computing device 120 or security server 150 in the pre-processed form (e.g., the hash of the data values.) Such pre-processing may be desirable because it facilitates comparison of metadata without requiring the actual metadata values to be transmitted from the scanning device 130. Instead, the pre-processed form of the metadata may be transmitted for increased security. In some embodiments, it may be impractical for a malicious entity to reverse the pre-processing procedure and obtain the original metadata (e.g., when the pre-processing comprises a hashing function). The pre-processed form of the metadata may also be shorter than the raw metadata, which may increase transmission speed and efficiency.

In some embodiments, the pre-processing may comprise a fuzzy hashing technique or context-triggered piecewise hashing algorithm. Such a technique or algorithm may create hashes of the metadata values that can match inputs containing homologies. A fuzzy hashing algorithm permits metadata to be matched to other metadata that is similar but not identical to the original metadata. For example, two sets of metadata with some differences may produce the same fuzzy hash if they contain sets of identical bytes of data, even though intervening bytes are different. A fuzzy hash may therefore be useful when comparing two versions of metadata that have changed slightly over time because fuzzy hashing permits slight variation in the input.

Computing device 120 may optionally apply a digital signature 440 to metadata 430. The step results in digitally signed metadata 450. For example, the digital signature may comprise creating a hash of the metadata and encrypting the hash according to a specific cryptographic key. In some embodiments, the cryptographic key may be preexisting on computing device 120 (e.g., stored in memory 222). In other embodiments, the cryptographic key may be received from security server 150. In embodiments where metadata 430 is sent to or stored on security server 150, security server 150 may apply digital signature 440 to metadata 430.

Computing device 120 may identify a verification token 460. Verification token 460 may be preexisting in computing device 120. In some embodiments, computing device 120 may receive verification token 460 from security server 150. In other embodiments, computing device 120 may generate verification token 460 and communicate it to security server 150.

Once metadata 430 has been received and computing device 120 has identified verification token 460, computing device 120 may generate an encoded representation 470 containing both metadata 430 and verification token 460. Encoded representation 470 may be a visual representation, for example, a QR code, barcode, encoded image, light pattern, or other form of visual representation as described above. In some embodiments, as discussed above, non-visual forms of encoded representation 470 are possible too (e.g., sound signal, heat signal, vibration signal, etc.).

Computing device 120 may make encoded representation 470 available for decoding, for example by electronically transmitting encoded representation 470 to scanning device 130. In some embodiments, computing device 120 may cause encoded representation 470 to be visually displayed on display medium 140, as discussed above. For example, encoded representation 470 may be displayed on an electronic screen or printed onto a paper made available to the user. In some embodiments, encoded representation 470 may be made available by transmitting a non-visual signal (e.g., sound signal, heat signal, vibration signal, etc.) to scanning device 130.

Scanning device 130 may receive encoded representation 470 from computing device 120. In some embodiments, scanning device 130 may receive encoded representation 470 from computing device 120 via electronic transmission (e.g., via I/O devices 233). In other embodiments, scanning device 130 may receive encoded representation 470 via scanning component 234. Scanning component 234 of scanning device 130 may scan encoded representation 470 when displayed on display medium 140. In some embodiments, scanning device 130 may be configured to separate encoded code 470 into multiple parts. For example, if encoded representation 470 is a multicolor code, scanning device 130 may separate encoded representation into single color codes for decoding.

Scanning device 130 may decode encoded representation 470. By decoding encoded representation 470, scanning device 130 may access verification token 460 and digitally signed metadata 450. In some embodiments, metadata 430 may not be digitally signed, so scanning device 130 may access unsigned metadata 430. Scanning device 130 may then compare the metadata received from computing device 120 with the scanning device's actual current metadata. For example, scanning device 130 may receive metadata for a software application (e.g., a web browser) from computing device 120. Scanning device 130 may then compare this received metadata to its own web browser metadata.

In some embodiments, scanning device 130 may verify the metadata by comparing the metadata values to determine if the two sets of metadata are identical. If the metadata are identical, the scanning device may transmit verification token 460 to security server 150 to complete the authentication process. In embodiments where the metadata is in the form of fuzzy hashes, scanning device 130 may determine if the fuzzy hashes are identical.

In other embodiments, scanning device 130 may compare the metadata, whether preprocessed (e.g., hashed) or not, to determine if the metadata are sufficiently similar according to a predetermined threshold. For example, the scanning device 130 may determine that the metadata are sufficiently similar if a certain percentage of the received metadata and the actual metadata are identical. If the similarity threshold is met, the metadata verification is successful and scanning device 130 may transmit verification token 460 to security server 150 to complete the authentication process. When the authentication is complete, for example, user of scanning device 130 may gain access to secure network resource 160. In some embodiments, the threshold may be predetermined by the scanning device 130 or an application on scanning device 130. In other embodiments, the threshold may be received by scanning device 130 from security server 150. As described in greater detail below, if the threshold is not met, scanning device 130 may not authorize completion of the authentication process and may send a report to security server 150.

In some embodiments, scanning device 130 may compare the received metadata 430 to an average of the scanning device 130's actual metadata over a certain time period. For example, if the specific metadata of scanning device 130 is changing over time, scanning device 130 may track and store the various instances of the metadata for specific period of time, e.g., one week, etc. Scanning device 130 may average the metadata values for the time period or otherwise determine a representative or typical value for the metadata. Scanning device 130 may then compare the received metadata with the typical value of the actual metadata.

In some embodiments, where metadata 430 is digitally signed, scanning device 130 may validate the digital signature. For example, scanning device 130 may reverse the encryption of digitally signed metadata 450 using an encryption key. Scanning device 130 may receive the encryption key from computing device 120, security server 150, or another network location. Once the encryption of the digitally signed metadata is reversed, scanning device 130 may compare the unencrypted metadata received from computing device 120 with the scanning device 130's actual metadata. In some embodiments, scanning device 130 may transmit the result of the digital signature validation to security server 150. Likewise, scanning device 130 may, in some embodiments, transmit the result of the digital signature validation to computing device 120.

In other embodiments, the digital signature may be received from security server 150. For example, security server 150 may receive metadata from scanning device 130 and digitally sign it. In some embodiments, security server 150 may send digitally signed metadata to computing device 120 for transmission to scanning device 130.

In some embodiments, scanning device 130 may be a mobile device with a dedicated application for conducting the user authentication process. The dedicated application may manage the sending and updating of metadata from the scanning device 130 to computing device 120 or security server 150. The dedicated application may also manage the receipt and transmission of verification tokens and data for validation of digital signatures. In some embodiments, the dedicated application may include software for using the mobile device's camera to scan encoded representations. The dedicated application may also provide alerts to the user when access requests are transmitted, digital signature validations fail, metadata verification fails, etc.

Figure 5:
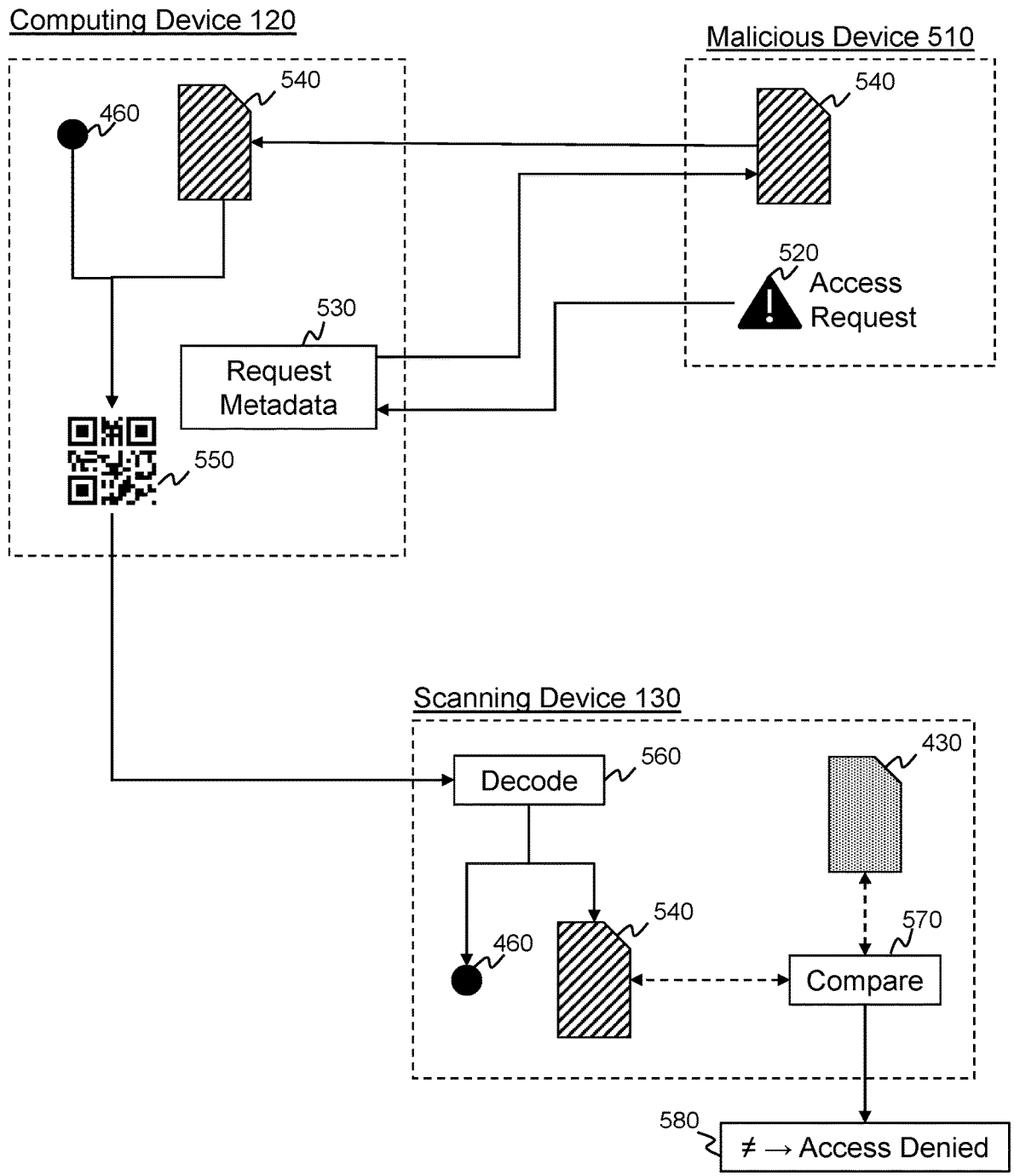
FIG. 5 is a block diagram depicting an exemplary process for preventing unauthorized access to a secure network location in accordance with disclosed embodiments.

FIG. 5 is a block diagram depicting an exemplary process 500 that may occur when an unauthorized or malicious user attempts to gain access to a restricted resource through computing device 120. Process 500 may correspond to parts of process 400 shown in FIG. 4 and, accordingly, descriptions of the components and processes therein may apply to process 500 as well. As described above, process 500 could be performed in response to an access request or command to access data, an application, or a secure location, for example by malicious device 510. In some embodiments, computing device 120 may receive access request 520 from security server 150 or another computing device communicating with network 110 in response to an unauthorized user's access attempt.

In response to access request 520, computing device 120 may request metadata from malicious device 510. Malicious device may send metadata 540 to computing device 120. As described above with respect to FIGS. 3 and 4, metadata 540 may be from a software application, document, image, etc.

In some embodiments, malicious device metadata 540 may not even be metadata at all, but rather random data values, null values, or other data values that the malicious device may transfer in lieu of metadata. In other words, malicious device 510 may or may not include an application configured to capture metadata 540. In some embodiments, as described above, metadata 540 may be sent in its raw form or in a pre-processed form. Computing device 120 may also digitally sign metadata 530.

As described above, computing device 120 may identify a verification token 460. Verification token 460 may be preexisting in computing device 120. In some embodiments, computing device 120 may receive verification token 460 from security server 150. In other embodiments, computing device 120 may generate verification token 460 and communicate it to security server 150.

Once metadata 540 has been received and computing device has identified verification token 460, computing device 120 may generate an encoded representation 550 containing both metadata 540 and verification token 460. Encoded representation 550 may be a visual representation, for example, a QR code, barcode, encoded image, light pattern, or other form of visual representation as described above. In some embodiments, as discussed above, non-visual forms of encoded representation 550 are possible too (e.g., sound signal, heat signal, vibration signal, etc.).

As described above with respect to FIG. 4, computing device 120 may make encoded representation 550 available for decoding, for example by electronically transmitting encoded representation 550 to scanning device 130. In some embodiments, computing device 120 may cause encoded representation 550 to be visually displayed on display medium 140, as discussed above. For example, encoded representation 550 may be displayed on an electronic screen or printed onto a paper made available to the user. In some embodiments, encoded representation 550 may be made available by transmitting a non-visual signal (e.g., sound signal, heat signal, vibration signal, etc.) to scanning device 130.

Scanning device 130 may receive encoded representation 550 from computing device 120. In some embodiments, scanning device 130 may receive encoded representation 550 from computing device 120 via electronic transmission. In other embodiments, scanning device 130 may receive encoded representation 550 via scanning component 234. Scanning component 234 of scanning device 130 may scan encoded representation 550 when displayed on display medium 140. In some embodiments, scanning device 130 may be configured to separate encoded code 550 into multiple parts. For example, if encoded representation 550 is a multicolor code, scanning device 130 may separate encoded representation into single color codes for decoding.

Scanning device 130 may decode encoded representation 550. By decoding encoded representation 550, scanning device 130 may access verification token 460 and digitally signed metadata 540. In some embodiments, metadata 540 may be digitally signed. Scanning device 130 may then compare the metadata 540, received from computing device 120, with the scanning device's actual metadata 430. For example, scanning device 130 may receive metadata for a software application (e.g., a web browser) from computing device 120. Scanning device 130 may then compare this received metadata to its own web browser metadata.

In some embodiments, scanning device 130 may compare the metadata to determine if the two sets of metadata are identical, as discussed above. If the metadata are identical, the scanning device may transmit verification token 460 to security server 150 to complete the authentication process. In the case of FIG. 5, however, scanning device 130 determines that the sets of metadata, whether or not the metadata is pre-processed or digitally signed, are not identical because the received metadata is from malicious device 510, not from scanning device 130. In some embodiments, scanning device 130 may compare the metadata to determine if the metadata are sufficiently similar according to a predetermined threshold. For example, the scanning device 130 may determine that the metadata are sufficiently similar if a certain percentage of the received metadata and the actual metadata are identical. The threshold may be configured to prevent metadata from malicious device 510 from being sufficiently similar to scanning device metadata 430 to meet the threshold.

In response to the failed comparison, scanning device 130 may not authorize completion of the authentication process (e.g., process 400). In some embodiments, scanning device 130 may send a report to security server 150. In some embodiments, scanning device 130 may generate an alert to be displayed to the user on scanning device 130 indicating that the metadata comparison was unsuccessful. In some embodiments, scanning device 130 or security server 150 may rotate an authentication credential (e.g., a verification token) to a new credential in response to a failed metadata comparison.

In some embodiments, if the received metadata 540 and actual device metadata 430 are so dissimilar as to fail to meet a maliciousness threshold, scanning device 130 may generate a notification to the user that a malicious or unauthorized device attempted to use the user's credentials. The notification may, for example, notify the user that he or she may have fallen victim to a phishing attack. Likewise, when the maliciousness threshold is not met, scanning device 130 may also send a second report to security server 150, for example, notifying the user of a possible phishing attempt. In some embodiments, security server 150, after receiving a predetermined number of phishing reports, may lock access to secure network location 160. In other embodiments, after receiving a predetermined amount of phishing reports, security server 150 may require additional steps or additional information from the user to complete the user authentication process (e.g., an answer to an additional security question, verification of metadata from another application on the scanning device, biometric identification, two-factor authentication, administrator approval, etc.).

Figure 6:
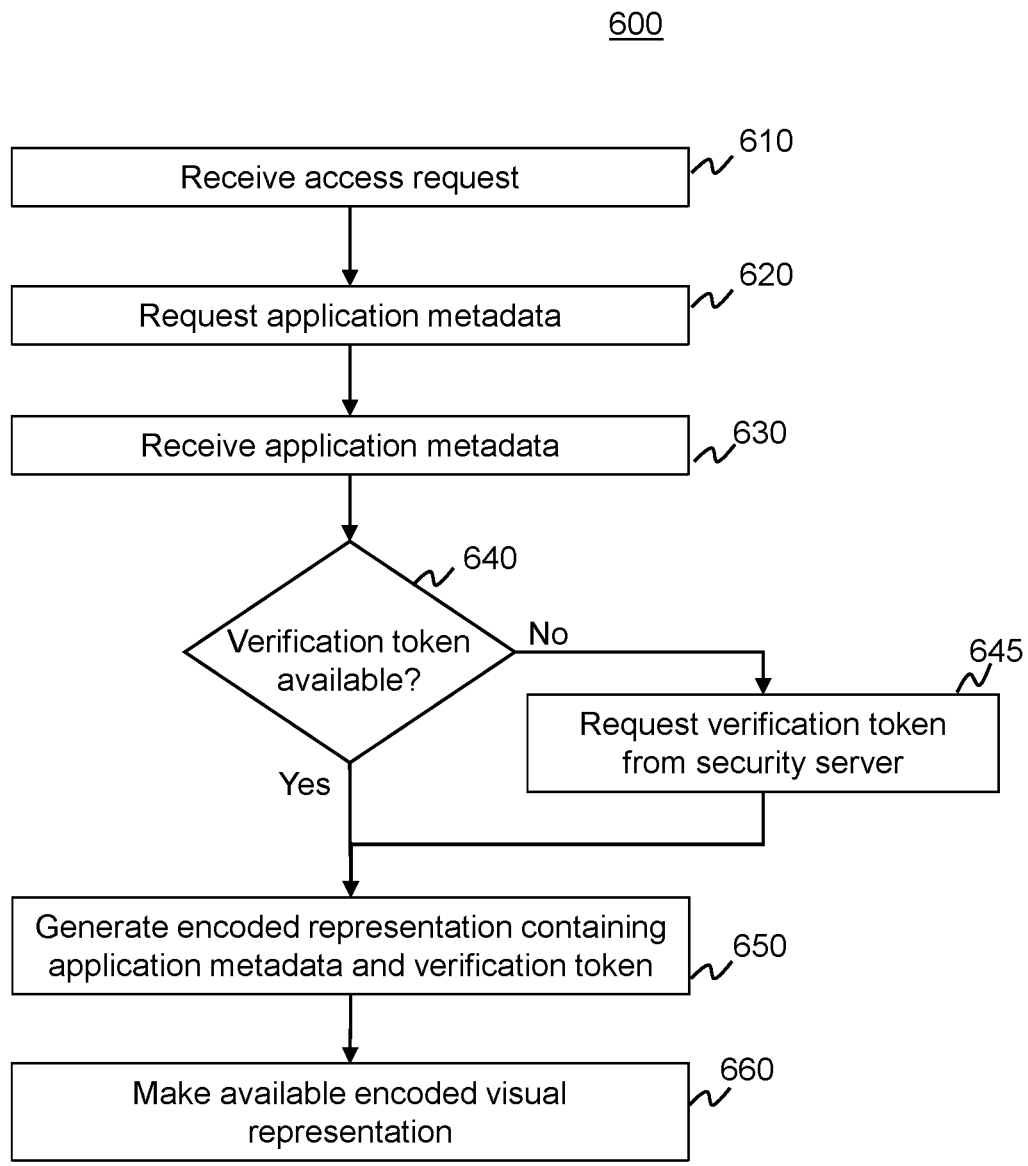
FIG. 6 is a flowchart depicting an exemplary process for a computing device to securely provide metadata to a scanning device for verification in accordance with disclosed embodiments.

FIG. 6 is a flowchart depicting an exemplary process 600 for transmitting an encoded representation containing unique metadata application fingerprints. Process 600 may correspond to parts of FIGS. 4 and 5, and accordingly descriptions of the components and processes therein may apply to process 600 as well. Process 600 may be implemented, for example, by processor 221, shown in FIG. 2A or by security server 150.

At step 610, process 600 may include receiving a request for access to a secure resource or location, e.g., secure network resource 160. At step 620, process 600 may request metadata in response to receiving access request 420. The request for metadata may be communicated to the device that transmitted access request 420, e.g., scanning device 130. At step 630, process 600 may receive metadata 430. As described above, metadata may comprise a variety of parameter values corresponding to a variety of different types of applications and files.

At step 640, process 600 may determine whether verification token 460 is available. If the verification token 460 is not available, process 600 may request verification token 460 from security server 150 in step 645. As described above, in some embodiments, verification token 460 may also be generated by computing device 120 and transmitted to security server 150.

At step 650, process 600 may generate an encoded representation of data containing both verification token 460 and metadata 430. In some embodiments, as discussed above, the encoded visual representation may be a unified encoded code created by combining multiple encoded visual representations. This may involve, for example, overlaying one encoded representation over another, combining portions of the encoded representations, creating a grouping or collection of encoded representations, or other techniques. In some embodiments, encoded representation 470 may be a non-visual code, for example, a sound signal, heat signal, vibration signal, etc.

At step 660, process 600 may include making available the encoded representation. As described above, computing device 120 may make available the encoded representation 470 by electronically transmitting the unified encoded code 470 to scanning device 130. In some embodiments, computing device 120 may make available the unified encoded code 470 for display on display medium 140. Once the unified encoded code 470 is received by scanning device 130, it may be decoded, as discussed below in connection with FIG. 7.

Figure 7:
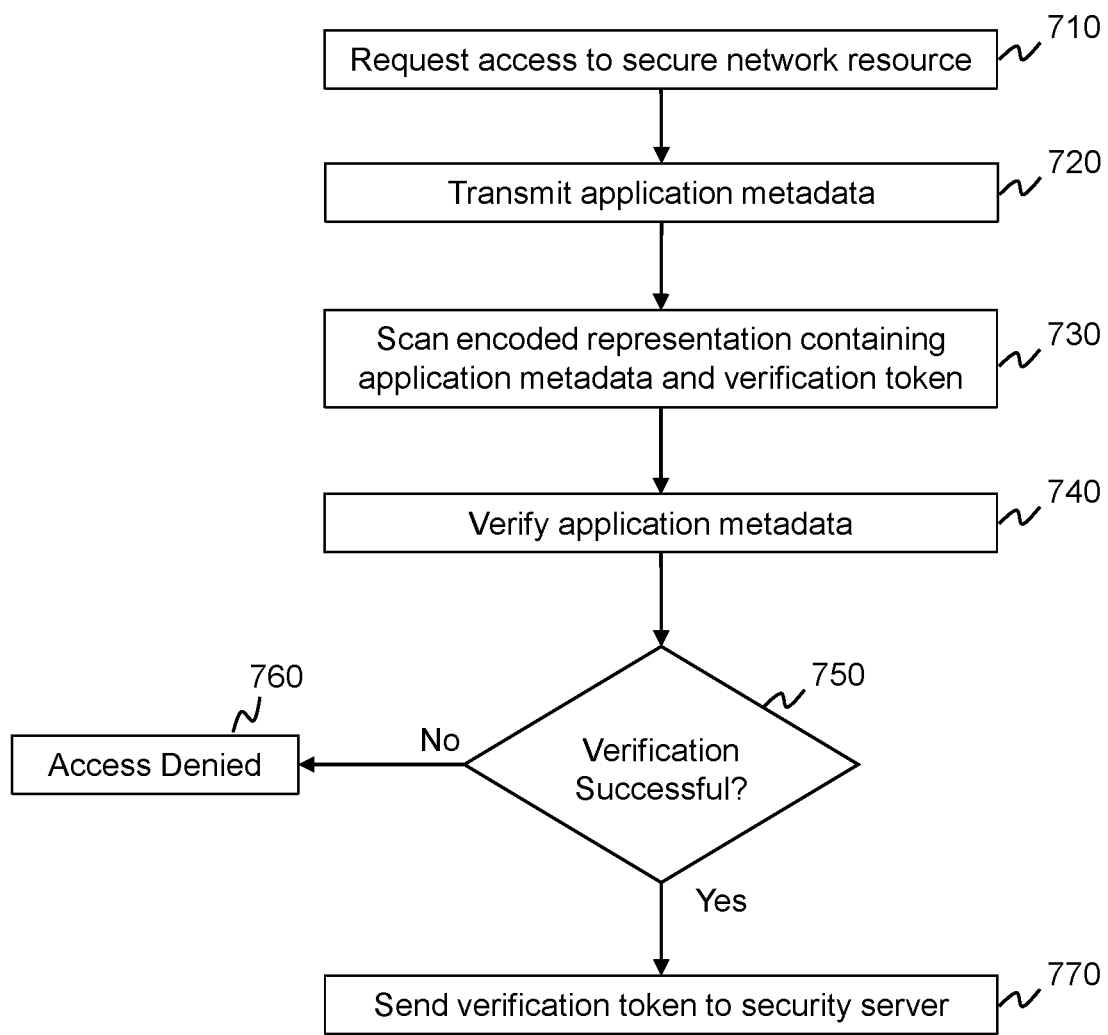
FIG. 7 is a flowchart depicting an exemplary process to complete a secure authorization of a scanning device in accordance with disclosed embodiments.

FIG. 7 is a flowchart depicting an exemplary process 700 for a scanning device 130 to securely receive an encoded representation from a computing device 120 to complete an authentication process. Process 700 may be implemented, for example by processor 231, shown in FIG. 2B, or by security server 150. Process 700 may correspond to parts FIGS. 4 and 5 and, accordingly, descriptions of the components and processes therein may apply to process 700 as well.

At step 710, process 700 may include requesting access to a secure network resource 160 or other secure location (e.g., website, application, operating system, server, computing device, physical location, vehicle, appliance, etc.). At step 720, process 700 may include transmitting metadata relating to an application or other aspect of scanning device 130. In some embodiments, step 720 may occur in response to scanning device 130 receiving a request for metadata from computing device 120 or security server 150.

At step 730, process 700 may include scanning or otherwise receiving an encoded representation 470. As discussed above, the encoded representation 470 may be sent directly to scanning device 130 or presented in proximity to it (e.g., via display device 140). The encoded representation 470 may contain metadata and a verification token, as discussed above. After scanning or receiving encoded representation 470, scanning device 130 may decode the encoded visual representation to access the metadata and verification token.

At step 740, process 700 may verify the application metadata received in the encoded representation 470. Scanning device 130 may execute this step by comparing the received metadata to the actual metadata stored on the scanning device 130. In some embodiments, scanning device 130 may verify the application metadata by validating a digital signature from computing device 120 or security server 150. In some embodiments, the scanning device 130 may verify the metadata by both comparing the received metadata with the actual metadata and validating a digital signature.

At step 750, process 700 may determine if the verification was successful. If the verification was successful, process 700 may proceed to step 770 and cause the scanning device 130 to send the verification token 460 to security server 150. The sending of the verification token may in some embodiments complete the authentication process and permit the user to gain access to the secure network resource 160. If the verification is not successful in operation 750, on the other hand, scanning device 130 may not send verification token 460 to security server 150, but rather proceed to operation 760 of denying access to the requested resource. In some embodiments, when the verification is not successful, scanning device may transmit a report to security server 150. In yet further embodiments, scanning device 130 may generate an alert to notify the user that the verification was not successful. As described above, in some embodiments, when the verification is not successful, the computing device 120 or security server 150 may rotate a security credential to provide added security to the authentication process.

Various potential use cases of the disclosed embodiments are described below. It is understood that these cases are provided by way of example only and are not limiting of the present disclosure.

One potential implementation may be to facilitate authorization of a user when logging in to a secure website. The user may access the website on her mobile device (e.g., smartphone) and attempt to login. The user's mobile device may then send an access request to a computing device or server associated with the website. In response to that request, the website computing device (e.g., web server or intermediate proxy server) may request metadata from the user's mobile device that is associated with the user's website account. The user's mobile device may then aggregate the requested metadata and transmit it to the website computing device.

After receiving the metadata from the user's mobile device, the website computing device may digitally sign the metadata and retrieve a verification token. The website computing device may then combine the signed metadata and verification token into an encoded representation (e.g., a QR code) and send the encoded representation to the user's mobile device. The user may then decode the encoded representation to obtain the verification token and signed metadata. The mobile device may then validate the digital signature and compare the received metadata with its actual metadata. Upon validation of the signature and verification of the metadata, the mobile device may then send the verification token back to the website computing device or a security server associated with the website. Upon receiving the verification token, the website computing device or server may complete the authorization process and grant the user access to secure website. Thus, a computing device may authenticate a user by communicating an encoded representation containing unique application metadata.

If a malicious user were to attempt to login to the secure website using the authorized user's credentials, the website computing device may request the malicious user's device metadata. It may then send the malicious user's metadata to the authorized user's mobile device for verification via a QR code. The authorized user's mobile device may decode the code and compare the metadata. In this case, the comparison may fail because the authorized user's mobile device metadata is not sufficiently similar to the malicious user's device metadata. The authorized user's mobile device may then thwart the malicious user's phishing attempt by sending a security report to the website computing device instead of the verification token.

Another possible implementation is using a mobile scanning device to authorize user access to a financial system. The financial system may be associated with a bank, credit card provider, etc. For example, an individual may wish to log in to his or her bank account at an ATM. The user may request access to her financial account at the ATM by entering her account credentials. The user may already have a mobile device preregistered with the bank and containing a dedicated bank application. The dedicated bank application may manage the transfer of metadata from the mobile device to a bank security server. The mobile device may periodically send metadata to the bank security server to update the bank's version of the metadata parameters.

After receiving the access request from the user, the ATM terminal may then request metadata associated with the user's mobile device from the bank's security server. After receiving this metadata, the ATM may combine with a verification token and generate a scannable code. The ATM may then display the scannable code on its screen. Using the mobile device, the user may scan the scannable code and decode it to receive the metadata and verification token. The mobile device may then verify the metadata by comparing it to the mobile device's current set of metadata. If the metadata are sufficiently similar, the mobile device may send the verification token to the bank security server. Upon receiving the verification token, the bank security server may permit the ATM to grant the user access to the financial account.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for generating and communicating encoded visual representations containing unique application fingerprints, the operations comprising:
   receiving application metadata associated with a personal computing device and defining a plurality of diverse attributes of an application installed on the personal computing device;
   identifying a request by an identity to access a secure network resource;
   identifying a unique verification token;
   generating an encoded visual representation that contains the application metadata and the unique verification token; and
   making available to the identity the encoded visual representation for the personal computing device to decode the encoded visual representation, the personal computer device being configured to:
   decode the encoded visual representation to access the application metadata;
   verify the accessed application metadata against the application attributes of the application installed on the personal computing device; and
   send, conditional on the metadata verification being successful, the unique verification token to a security server, the security server being configured to:
   receive the unique verification token; and
   grant the personal computing device access to the secure network resource based on the verification token.

2. The non-transitory computer readable medium of claim 1, wherein the application metadata is received from the personal computing device in response to the identity requesting access to the secure network resource.

3. The non-transitory computer readable medium of claim 1, wherein the application metadata is received from the personal computing device as part of a registration process of the personal computing device.

4. The non-transitory computer readable medium of claim 1, wherein the application metadata is an aggregation of parameter values associated with the application.

5. The non-transitory computer readable medium of claim 1, wherein the application metadata is a hash of parameter values associated with the application.

6. The non-transitory computer readable medium of claim 1, wherein the application metadata is a fuzzy hash of parameter values associated with the application.

7. The non-transitory computer readable medium of claim 1, wherein the application metadata defines values of parameters including one or more of: a time zone, a font, a rendered picture, an installed plugin, a header field, a cookies preference, a privacy setting, an advertising setting, a screen resolution, and a use of local storage.

8. The non-transitory computer readable medium of claim 1, wherein the operations further comprise generating a digital signature of the application metadata.

9. The non-transitory computer readable medium of claim 8, wherein the operations further comprise receiving, from the personal computing device, a result of a verification of the digital signature.

10. The non-transitory computer readable medium of claim 1, wherein the operations further comprise validating the identity based on a verification of the application metadata.

11. A computer-implemented method for generating and communicating encoded visual representations containing unique application fingerprints, the method comprising:

receiving application metadata associated with a personal computing device and defining a plurality of diverse attributes of an application installed on the personal computing device;

identifying a request by an identity to access a secure network resource;

identifying a unique verification token;

generating an encoded visual representation that contains the application metadata and the unique verification token; and making available to the identity the encoded visual representation for the personal computing device to decode the encoded visual representation, the personal computer device being configured to:
- decode the encoded visual representation to access the application metadata;
- verify the accessed application metadata against the application attributes of the application installed on the personal computing device; and
- send, conditional on the metadata verification being successful, the unique verification token to a security server, the security server being configured to:
  - receive the unique verification token; and
  - grant the personal computing device access to the secure network resource based on the verification token.

12. The computer-implemented method of claim 11, wherein the application metadata is received from the personal computing device in response to the identity requesting access to the secure network resource.

13. The computer-implemented method of claim 11, wherein the application metadata is received from the personal computing device as part of a registration process of the personal computing device.

14. The computer-implemented method of claim 11, wherein the application metadata is an aggregation of parameter values associated with the application.

15. The computer-implemented method of claim 11, wherein the application metadata is a hash of parameter values associated with the application.

16. The computer-implemented method of claim 11, wherein the application metadata is a fuzzy hash of parameter values associated with the application.

17. The computer-implemented method of claim 11, wherein the application metadata defines values of parameters including one or more of: a time zone, a font, a rendered picture, an installed plugin, a header field, a cookies preference, a privacy setting, an advertising setting, a screen resolution, and a use of local storage.

18. The computer-implemented method of claim 11, further comprising generating a digital signature of the application metadata.

19. The computer-implemented method of claim 18, further comprising receiving, from the personal computing device, a result of a verification of the digital signature.

20. The non-transitory computer-implemented method of claim 11, further comprising validating the identity based on a verification of the application metadata.

* * * * *